Figures 7, 8:
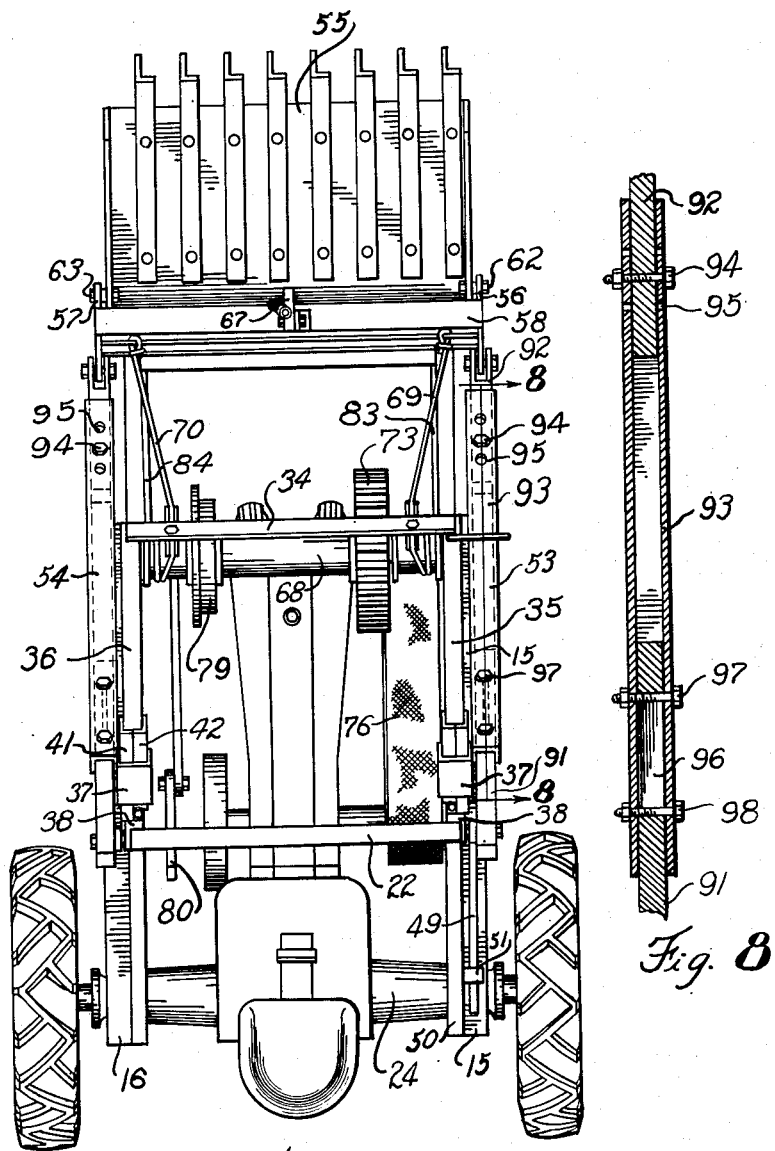

April 7, 1942. B. CALVERT 2,278,412
LIFTING ATTACHMENT FOR TRACTORS
Filed Nov. 9, 1940 4 Sheets-Sheet 1
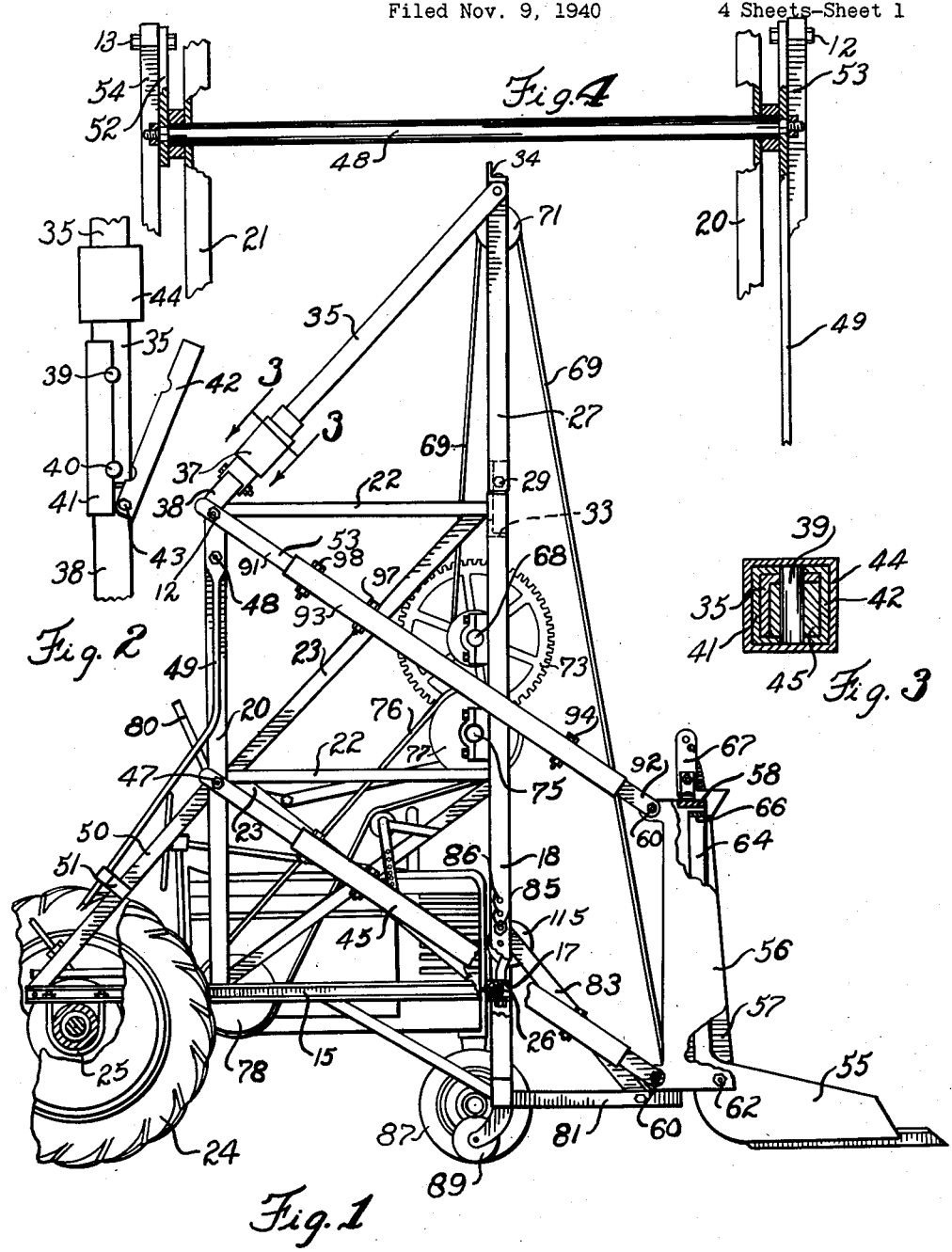
INVENTOR,
BERNARD CALVERT,
By Minturn & Minturn
ATTORNEYS.

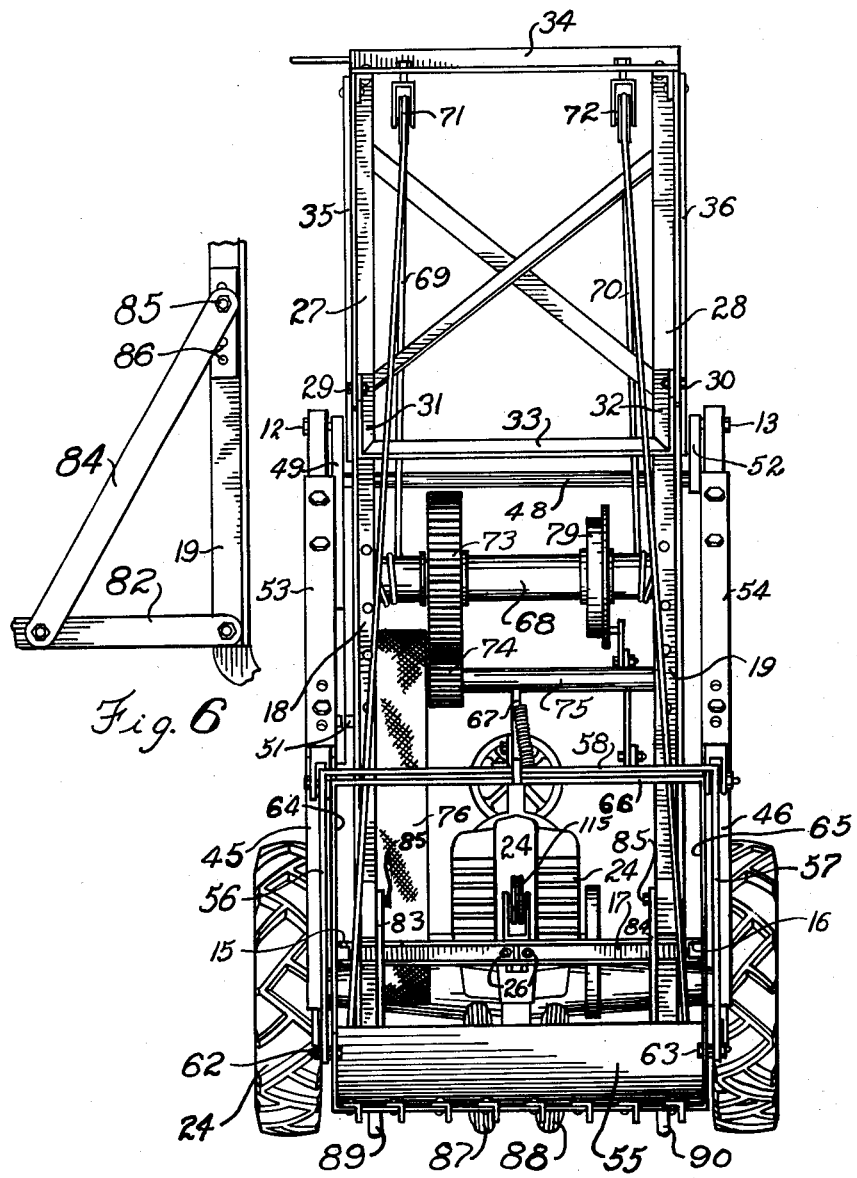

April 7, 1942.  B. CALVERT  2,278,412
LIFTING ATTACHMENT FOR TRACTORS
Filed Nov. 9, 1940  4 Sheets-Sheet 3

INVENTOR,
BERNARD CALVERT,
By Minturn & Minturn
ATTORNEYS.

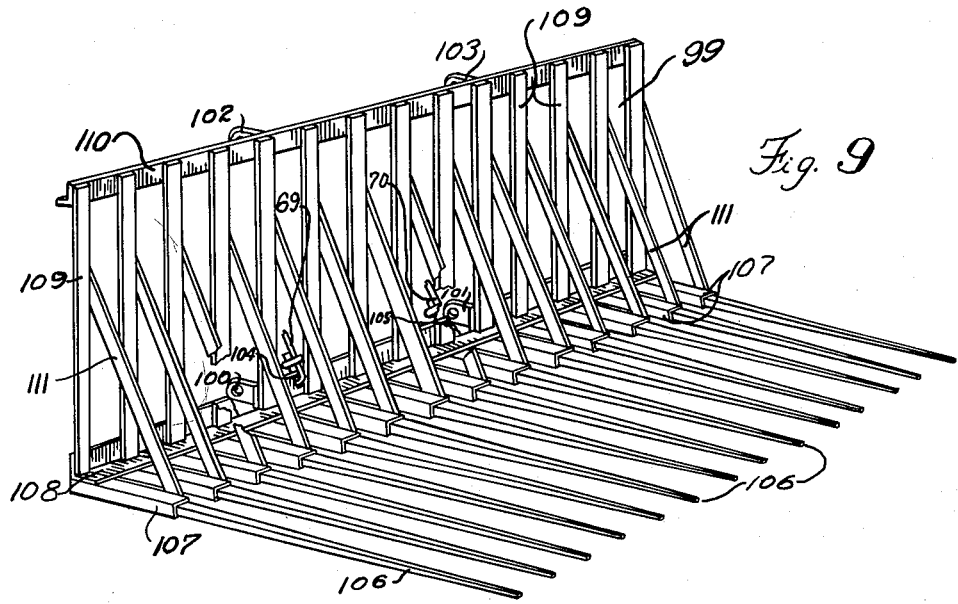
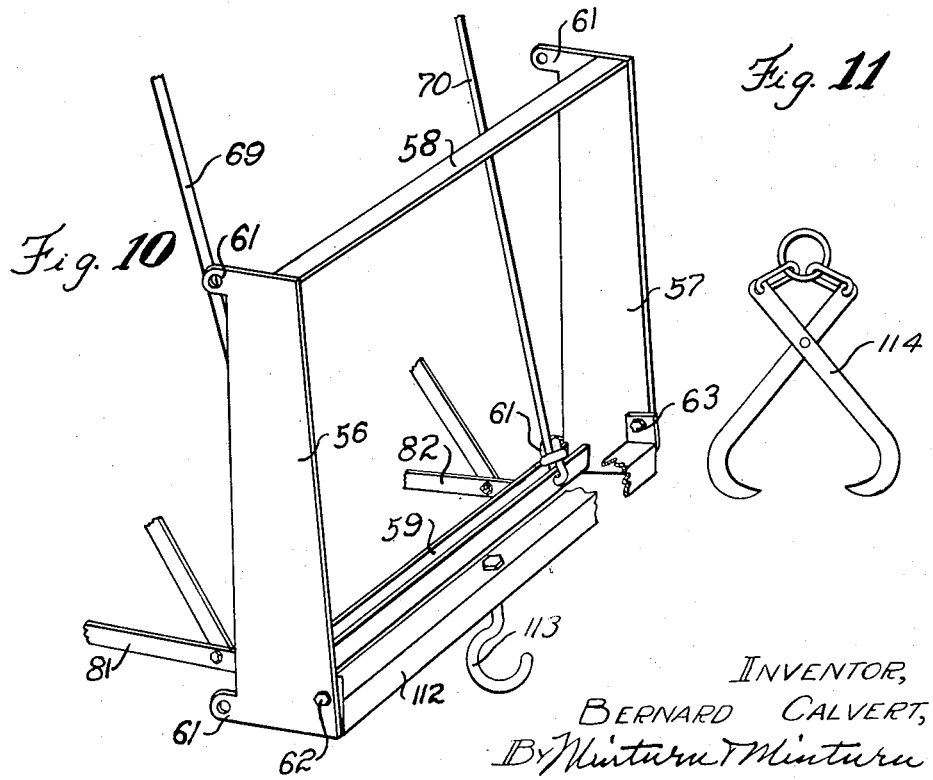

Patented Apr. 7, 1942

2,278,412

UNITED STATES PATENT OFFICE 2,278,412

LIFTING ATTACHMENT FOR TRACTORS

Bernard Calvert, near Worthington, Ind.

Application November 9, 1940, Serial No. 365,028

5 Claims. (Cl. 214—141)

This invention relates to an attachment for tractors wherein a wide range of operations may be carried out by the tractor, such as raking hay in the field, transporting the hay to a stack or a wagon, and then lifting the raked hay and depositing it on the stack or the wagon as the case may be; for digging and moving dirt, and for lifting and transporting operations in general.

It is a primary object of the invention to provide a structure of the above indicated type which may be universally employed on different makes of tractors without any complicated attaching means. In that regard, the invention is embodied in a form wherein the tractor may be driven within a generally U-shaped frame and the frame attached to the tractor preferably at three points, such as over the rear axle of the tractor on either side thereof and at a central point on the front end of the tractor.

A further important object of the invention is to provide a structure for carrying out the above indicated uses in the most effective and simply controlled manner and yet be exceedingly simple in form whereby the over-all cost is relatively low. In addition there is the important object of varying the angularity of the tool being employed, such as a rake, particularly as between the lowered and the raised positions, by a very simple and easily controlled mechanism.

These and many other objects and advantages of the invention will become apparent to those versed in the art in the following description of one particular form of the invention as illustrated more or less diagrammatically in the accompanying drawings, in which Fig. 1 is a view in side elevation of a structure embodying the invention as applied to a tractor;

Fig. 2, a detail in side elevation of a frame latching connection in top plan view;

Fig. 3, a detail in transverse section on the line 3—3 in Fig. 1;

Fig. 4, a detail on an enlarged scale in rear elevation of a lift arm pivot adjusting means;

Fig. 5, a view in front elevation of the structure shown in Fig. 1;

Fig. 6, a detail in side elevation of the left-hand side tool lower limit arm;

Fig. 7, a view in top plan of the structure shown in Fig. 1;

Fig. 8, a view in longitudinal section on the line 8—8 in Fig. 7;

Fig. 9, a view in front perspective of a rake structure;

Fig. 10, a view in front perspective of a frame for carrying, lifting and dirt moving tool and the like; and Fig. 11, a view in side elevation of a grapple hook formed for use in conjunction with the structure.

Like characters of reference indicate like parts throughout the several views in the drawings.

A more or less tower-like structure is formed preferably out of structural metal members to have a pair of spaced apart channel members 15 and 16 interconnected at their forward ends by a cross channel member 17 to form a base; and from that base have a pair of front posts 18 and 19 extend upwardly therefrom and also a pair of rear posts 20 and 21 tied together in a rigid manner by suitable transverse and diagonally positioned members 22 and 23 respectively properly positioned and proportioned for the required structural strength; the tower constituting in effect an open rectangular steel or metal framework open from the rear side sufficiently to permit a tractor, generally designated by the numeral 24, to be driven between the channel members 15 and 16 to have the rear ends of those members come over the top side of and be secured to the axle of the tractor by any suitable means, such as by a U-bolt 25, as indicated in Fig. 1. It is understood, of course, as shown in Fig. 7, that the rear ends of the channels 15 and 16 will be equally spaced apart from the center line of the tractor. The front cross member 17 of the base of the tower will be attached in any suitable manner to the forward end of the tractor 24, such as by bolts 26, Figs. 1 and 5, passing through the member 17 and into the framework of the tractor. The tractor 24 herein shown is of that type to which various tools, such as cultivators and the like, may be attached and, therefore, carries the usual threaded holes in the forward end to receive bolts, and an advantage of this fact is taken by using the bolts 26 to pass through the cross member 17 and enter those holes.

On the tower structure so far described are hinged respectively to the front posts 18 and 19 as extensions thereof short posts 27 and 28, these short posts being hinged by bolts 29 and 30 respectively passing through flanges at their lower ends and upturned inner legs 31 and 32 respectively of a cross member 33 secured between the upper ends of the posts 18 and 19 in any suitable manner, such as by welding. The upper ends of these short posts 27 and 28 are tied together by a member 34, herein shown as an angle iron. The posts 27 and 28 are normally maintained in their vertically extending positions from the posts 18 and 19 by means of rearwardly and downwardly extending braces 35 and 36, the upper ends of these braces being pivotally connected to the sides of the short posts 27 and 28 and extending through releasable latch mechanisms, generally designated by the numeral 37. Beyond the latch mechanisms 37, short brace arm extensions 38 extend to engage with and at the upper ends of the rear posts 20 and 21. The purpose of these latch mechanisms 37 is to provide a disconnecting joint whereby the braces 35 and 36 may be released and allow the short posts 27 and 28 to be swung around forwardly and downwardly to reduce the over-all elevation of the tower structure and thereby permit the structure to be moved under tree limbs or through doorways and the like that are normally too low to permit passage thereunder or therethrough with the posts 27 and 28 in their upwardly extending positions.

The exact form of the latch mechanism in the one form now employed is illustrated in detail in Figs. 2 and 3 wherein the brace in each instance (brace 35 being selected as an example) comprises a pair of pins 39 and 40 extending through the brace 35 to project therefrom from both top and bottom sides; a U-channel iron 41 secured to the extension 38; a U-shaped arm 42 pivotally connected by a bolt 43 through its lower end to the extension 38; and a rectangular sleeve 44 that slides down over both the member 41 and the swinging member 42 when that member 42 is swung around in telescoping relation over the lower end of the brace 35, the member 42 being suitably notched to receive the pins 39 and 40 in part at least. The arm 35 in the present form is indicated as comprising an angle bar into the lower end of which is inserted a block of metal 45, Fig. 3, to give an added bearing and support for the pins 39 and 40. As indicated in Fig. 2, the members 41 and 42 are so proportioned and the pins 39 and 40 are so located that substantially half of the pins 39 and 40 are received in the notches provided in each of the members 41 and 42. When the sleeve 44 is slipped over both members 41 and 42, the member 42 is restrained against outward swinging and, therefore, the member 35 is prevented from traveling longitudinally from the extension 38 by reason of the pin engagement within the notches of both members 41 and 42.

A pair of lower elevating arms, designated generally by the numerals 45 and 46, are pivoted one on each side of the above indicated tower by their rear ends on the rear respective posts 20 and 21 above the channel irons 15 and 16 at an elevation indicated by the bolt 47, Fig. 1. These arms 45 and 46 are thus pivoted to swing about the same horizontally disposed axis and are given sufficient length to extend forwardly of the front posts 18 and 19. Carried between the rear posts 20 and 21 near their upper ends is a transverse shaft 48 to extend through and beyond the posts. On the outer right-hand end of the shaft 48 is fixed a control lever 49 in any suitable manner, such as by fitting on a squared end of the shaft 48, but in any event in such manner that the shaft 48 may be rocked by rocking the lever 49 itself. In the form herein shown, the lever 49 has a short end extending upwardly above the axis of the shaft 48 and a longer length extending downwardly therefrom along the side of the post 20 and thence rearwardly and downwardly in the general direction of a brace 50 that extends upwardly and forwardly from the rear end of the channel frame member 15 to the post 20. The lower end of this lever 49 is normally engaged under a hook 51 to retain it in the position just described.

On the other end of the shaft 48 is fixed a short lever 52 to extend normally upwardly in parallel relation to the upturned end of the lever 49. To the respective upper ends of the levers 49 and 52 are pivotally connected through bolts 12 and 13 to the rear ends of the top elevating arms, generally designated by the numerals 53 and 54.

In the example illustrated, a shovel 55 is shown as being the tool to be carried and operated by these top and lower elevating arms. A framework is employed to comprise essentially a pair of spaced apart side plates 56 and 57 tied together in fixed manner at their upper ends by the transversely positioned bar 58 and across their lower ends by a member 59, Fig. 10. The two lower elevating arms 45 and 46 are rockably attached to the lower ends of the respective plates 56 and 57 while the two upper elevating arms 53 and 54 are pivotally connected with the upper ends of those plates. One suitable form of connection is that illustrated in Fig. 1 wherein bolts 60 pass through the forward ends of the arms and through ears 61 provided on the rear side of the respective plates, Fig. 10. The shovel 55 is rockably attached by bolts 62 and 63 to the lower ends of the respective side plates 56 and 57 so that the shovel extends principally forwardly of the plates and may be rocked therebetween. From the rear end of the shovel 55 extends an arm 64 from the one side and 65 from the other upwardly along the respective plates 56 and 57 to be interconnected by their top ends by the transverse bar 66 normally being positioned immediately under the bar 58. A spring retaining latch 67 carried on the bar 58 drops down in front of the shovel bar 66 to hold the shovel 55 in a normal, more or less horizontally disposed position, releasing of the latch permitting the forward end of the shovel 55 to drop.

Mounted on the front posts 18 and 19 is a horizontally disposed cable drum 68 from which extend a pair of cables 69 and 70 upwardly therefrom and over pulleys 71 and 72 that are carried by the extreme top tower member 34. From those pulleys the two cables extend downwardly and are secured by their lower ends to the lower transverse member 59 that interconnects the plates 56 and 57, the cable connections therewith being preferably forward of the connections of the lower side arms 45 and 46 with the side plates 56 and 57. The cable drum 68 is driven through a spur gear 73 meshing with a spur gear 74 on a jackshaft 75. In turn the jackshaft 75 is driven by any suitable means, such as by a belt 76 wrapping about a pulley 77 on the shaft 75 and the usual power driven pulley 78 on the tractor 24. The tractor pulley 78 is of the usual and well known type that is operated through a clutch mechanism, the details of which do not enter into the present invention and constitute a well known part of the tractor 24. The essential feature is, however, that there be some clutch mechanism interposed whereby the operation of the cable drum 68 may be controlled at the will of the operator. The tractor, therefore, supplies power through its driving pulley 78 to operate the cable drum 68 in a direction whereby the cable 69 and 70 will be wound thereon to lift the tool being operated, herein shown as the shovel 55.

Now assuming that the tractor has been driven forwardly to cause the shovel 55 to become filled with dirt or whatever commodity or material is being worked upon, and it is desired to elevate that material and dump it into a wagon or truck, the tractor pulley 78 is set into operation to cause the cables 69 and 70 to be wound about the drum 68. The cables 69 and 70 will, therefore, start lifting the shovel 55 through its carrier above described. Now as the cables 69 and 70 pull upwardly, the arms 45, 46 and 53, 54 will maintain the position of the shovel 55 in the same position throughout its lift that it started from. In other words, there is a parallel action secured through the use of these elevating arms. Moreover as the lifting continues, it will be noted that the shovel 55 will be caused to swing outwardly away from the forward sides of the posts 18 and 19 through the initial elevated travel. This is desirable in order to space the shovel further away from those posts to permit clearance between the posts and the side of the truck or wagon to which the shovel is carried for dumping. When the shovel 55 is pulled up to the desired elevation, its forward end may be tilted downwardly by releasing the lever 49 from the holding book 51. This release of the lever 49 permits the shaft 48 to rock and thereby shift forwardly the upper pivoted ends of the arms 53 and 54, permitting the side plates 56 and 57 to rock forwardly by their upper ends. In other words, through the lever 49, the pivot axes of the rear ends of the arms 53 and 54 may be shifted so as to rock accordingly the shovel 55 or other tool being employed.

Preferably the cable drum 68 is provided with a brake drum 79 controlled by an operating lever 80 within reach of the operator who may be driving the tractor 24. The exact details of the brake drum and its control do not enter into this invention per se and are, therefore, not shown. Return of the shovel 55 to its lower initial position is by effect of gravity upon release of the pulley 78 from its power drive. The lowermost position of the shovel 55 is primarily determined by a pair of arms 81 and 82 extending forwardly from lower ends of the posts 18 and 19 extending below the front cross member 17. The outer ends of these arms 81 and 82 are in the path of the transverse bar 59 that ties together the lower ends of the side plates 56 and 57. To control the elevation of the outer ends of these arms 81 and 82, braces 83 and 84 are rockably attached to the respective arms 81 and 82 and are carried upwardly and rearwardly to have their rear ends adjustably positioned by a bolt 85 in each case selectively positioned through any one of a number of holes 86 provided through the posts 18 and 19. Thus by raising or lowering the rear ends of the braces 83 and 84, the front ends of the arms 81 and 82 may be raised and lowered accordingly.

Where the device above described is to be employed on tractors of the type illustrated carrying a pair of front pneumatic tires 87, 88 not sufficiently large to carry the load of the structure and the weight of the material to be lifted, a pair of caster wheels 89 and 90 are supplied to be mounted under the lower ends of the posts 18 and 19 to ride upon the ground.

Referring now to the arms 53 and 54, these arms, Figs. 7 and 8, are each made in a number of sections. There is in each instance an inner and outer section 91 and 92 respectively, each telescoping within a tubular member 93. One section, herein indicated as the outer section 92, may be adjustably positioned in relation to the tube 93 by means of a bolt 94 passing selectively through any one of the number of holes 95 provided through the tube and through a single hole in the section 92. The other section 91 is preferably provided with a slot 96 near its inner end within the tube 93. When such a tool as the shovel 55 is being employed, it is desirable to permit the arms 53 and 54 to travel longitudinally somewhat in order to prevent undue shock thereon as the shovel 55 is being pushed forwardly into the material being handled. In such usage, a bolt 97 would be passed through the tube 93 and through the slot 96 toward its front end. This would permit the arm to be normally extended but also permit the arm to retract in effectual length as determined by the length of the slot 96 should some undue resistance be encountered in pushing forwardly on the shovel 55. To make the arm in each instance of fixed length, a second bolt 98 is employed to pass through the tube 93 at the upper end of the slot 96 as illustrated in Fig. 8. This, of course, prevents any relative travel between the section 91 and the tube 93. In like manner the two lower arms 45 and 46 may be made to be adjustable although the use of the slot above indicated is in most instances omitted.

While the foregoing description has been made in reference to the use of a shovel 55, a probably wider use of the invention will be had on the average farm of a push rake, generally designated by the numeral 99, of the type illustrated in Fig. 9. When such a rake is employed, the side plates 56 and 57 are dispensed with and the framework of the rake takes their places. With the rake, the lower and top arms 45, 46 and 53, 54 are respectively pivotally connected to rearwardly turned ears on the rake, 100, 101 and 102, 103. The ends of the cables 69 and 70 are engaged in any suitable manner, such as by holes 104 and 105 respectively on the rake frame. As indicated in Fig. 9, the rake 99 is of the general type employed as a push rake to have a plurality of rake teeth 106 normally horizontally disposed and extending from sockets 107 receiving the rear ends of the teeth therein. The sockets 107 are secured in spaced apart relation to a bar 108 extending transversely thereacross to determine the width of the rake. From the bar 108 extend upwardly the vertically positioned bars 109 to carry the upper transverse bar 110 to which are secured the upper ears 102 and 103. To form a completely rigid structure, braces 111 extend preferably from the upright bars 109 forwardly and downwardly to the sockets 107.

Going back to the use of the side plates 56 and 57, in place of the shovel 55, a bar 112 may be carried across the forward lower ends thereof to employ the bolts 62 and 63 as securing means therefor. This bar 112 may be employed advantageously as a means for carrying in general a lifting hook 113 for lifting and pulling operations and also for receiving a grapple hook 114, such as is shown in Fig. 11, for handling logs and the like. Again, to show the universality of the structure, a pulley 115 may be mounted on the front panel bar 17 and one of the cables 69 or 70 carried downwardly and around thereunder and extended forwardly to engage with any object desired to be pulled whereby the structure then serves very effectively as a winch.

While I have herein shown and described my invention in the one particular form, it is obvious that structural changes and variations may be employed, particularly in the forming of the tower, without departing from the spirit of the invention and I, therefore, do not desire to be limited to that precise form beyond the limitations as may be imposed by the following claims.

I claim:

1. In a lifting device attachment for a tractor having a power pulley, a tower, a generally U-shaped frame supporting the tower formed to have a leg on each side of the tractor for rear axle support and to have a front member for front tractor end engagement; a pair of lower elevating arms each pivotally carried by the tower by their rear ends at a common elevation; one on each side of the tower to extend forwardly thereof; a pair of upper elevating arms, means rockably carried by the tower and pivotally carrying said upper arms by their rear ends at a common elevation spaced above that of the pivots of said lower arms and extending forwardly of the tower; a tool carrier pivotally engaged at upper and lower elevations by the forward ends of both of said pairs of arms; a cable winding drum carried by said tower; a cable engaging the drum and extending upwardly therefrom; a pulley in the upper part of said tower over which the cable passes to drop downwardly therefrom to engage said tool carrier; driving means between said tractor pulley and said cable drum; and means for shifting the pivot points of the rear ends of said upper arms in a principally fore and aft direction; and lost motion means in said upper arms limiting the length of the arms consisting of telescoping arm portions interconnected by a bolt in one portion passing through a longitudinal slot in the other portion and permitting the retraction thereof within a predetermined limit.

2. In a lifting device attachment for a tractor having a power pulley, a tower, a generally U-shaped frame supporting the tower formed to have a leg on each side of the tractor for rear axle support and to have a front member for front tractor end engagement; a pair of lower elevating arms each pivotally carried by the tower by their rear ends at a common elevation; one on each side of the tower to extend forwardly thereof; a pair of upper elevating arms, means rockably carried by the tower and pivotally carrying said upper arms by their rear ends at a common elevation spaced above that of the pivots of said lower arms and extending forwardly of the tower; a tool carrier pivotally engaged at upper and lower elevations by the forward ends of both of said pairs of arms; a cable winding drum carried by said tower; a cable engaging the drum and extending upwardly therefrom; a pulley in the upper part of said tower over which the cable passes to drop downwardly therefrom to engage said tool carrier; driving means between said tractor pulley and said cable drum; and means for shifting the pivot points of the rear ends of said upper arms in a principally fore and aft direction; a member carried by said tower positioned to limit the downward travel of said tool carrier; and means adjustably positioning that limiting member.

3. In a lifting device attachment for a tractor having a power pulley, a tower, a generally U-shaped frame supporting the tower formed to have a leg on each side of the tractor for rear axle support and to have a front member for front tractor end engagement; a pair of lower elevating arms each pivotally carried by the tower by their rear ends at a common elevation; one on each side of the tower to extend forwardly thereof; a pair of upper elevating arms, means rockably carried by the tower and pivotally carrying said upper arms by their rear ends at a common elevation spaced above that of the pivots of said lower arms and extending forwardly of the tower; a tool carrier pivotally engaged at upper and lower elevations by the forward ends of both of said pairs of arms; a cable winding drum carried by said tower; a cable engaging the drum and extending upwardly therefrom; a pulley in the upper part of said tower over which the cable passes to drop downwardly therefrom to engage said tool carrier; driving means between said tractor pulley and said cable drum; and means for shifting the pivot points of the rear ends of said upper arms in a principally fore and aft direction, said pivot shifting means comprising a rock lever system to which the upper arms are rockably attached, and a handle for advancing and retracting said lever system.

4. In a lifting device attachment for a tractor having a power pulley, a tower, a generally U-shaped frame supporting the tower formed to have a leg on each side of the tractor for rear axle support and to have a front member for front tractor end engagement; a pair of lower elevating arms each pivotally carried by the tower at their rear ends at a common elevation; one on each side of the tower to extend forwardly thereof; a pair of upper elevating arms, means rockably carried by the tower and pivotally carrying said upper arms by their rear ends at a common elevation spaced above that of the pivots of said lower arms and extending forwardly of the tower; a tool carrier pivotally engaged at upper and lower elevations by the forward ends of both of said pairs of arms; a cable winding drum carried by said tower; a cable engaging the drum and extending upwardly therefrom; a pulley in the upper part of said tower over which the cable passes to drop downwardly therefrom to engage said tool carrier; driving means between said tractor pulley and said cable drum; and means for shifting the pivot points of the rear ends of said upper arms in a principally fore and aft direction; said tower consisting of a skeleton metal frame as the part carrying all of said arms and said drum; a top tower section carrying said pulley; and means permitting lowering of said top section.

5. In a lifting device attachment for a tractor having a power pulley, a tower, a generally U-shaped frame supporting the tower formed to have a leg on each side of the tractor for rear axle support and to have a front member for front tractor end engagement; a pair of lower elevating arms each pivotally carried by the tower by their rear ends at a common elevation; one on each side of the tower to extend forwardly thereof; a pair of upper elevating arms, means rockably carried by the tower and pivotally carrying said upper arms by their rear ends at a common elevation spaced above that of the pivots of said lower arms and extending forwardly of the tower; a tool carrier pivotally engaged at upper and lower elevations by the forward ends of both of said pairs of arms; a cable winding drum carried by said tower; a cable engaging the drum and extending upwardly therefrom; a pulley in the upper part of said tower over which the cable passes to drop downwardly therefrom to engage said tool carrier; driving means between said tractor pulley and said cable drums; and means for shifting the pivot points of the rear ends of said upper arms in a principally fore and aft direction; said cable engagement with said carrier being forward of the connections therewith by said lower arms and substantially at the same elevation of those connections.

BERNARD CALVERT.